United States Patent [19]

Kano et al.

[11] Patent Number: 4,556,792
[45] Date of Patent: Dec. 3, 1985

[54] ROTARY ENCODER ASSEMBLY AND INSTALLATION FIXTURE

[75] Inventors: Takao Kano, Mitaka; Katsuhiko Makino, Tokyo, both of Japan

[73] Assignee: Sumtak Corporation, Tokyo, Japan

[21] Appl. No.: 493,813

[22] Filed: May 12, 1983

[51] Int. Cl.[4] .............................................. G01D 5/34
[52] U.S. Cl. ........................ 250/231 SE; 250/237 G
[58] Field of Search ........ 250/231 R, 231 SE, 237 G, 250/239; 356/395; 340/347 P; 324/175

[56] References Cited

U.S. PATENT DOCUMENTS

| 4,266,125 | 5/1981 | Epstein et al. | 250/237 G |
| 4,317,032 | 2/1982 | Hanus et al. | 250/239 |
| 4,343,992 | 8/1982 | Blaser | 250/231 SE |
| 4,345,149 | 8/1982 | Blaser | 250/231 SE |

Primary Examiner—David C. Nelms
Attorney, Agent, or Firm—Oblon, Fisher, Spivak, McClelland & Maier

[57] ABSTRACT

This invention relates to a rotary encoder for use in measuring the number of revolutions per minute or measuring the angular phase of a rotary shaft of a rotary machine. The encoder is provided with a fixed slit disc having slits therein, and a rotary slit disc disposed so as to be spaced from the fixed slit disc at a predetermined distance, having a plurality of slits arranged radially at regular angular intervals, and adapted to be rotated with the rotary shaft. The encoder is shipped to a user after the rotary slit disc has been fastened to the fixed slit disc on the part of the manufacturer.

5 Claims, 9 Drawing Figures

FIG. 1
FIG. 2
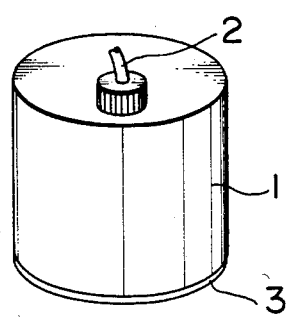
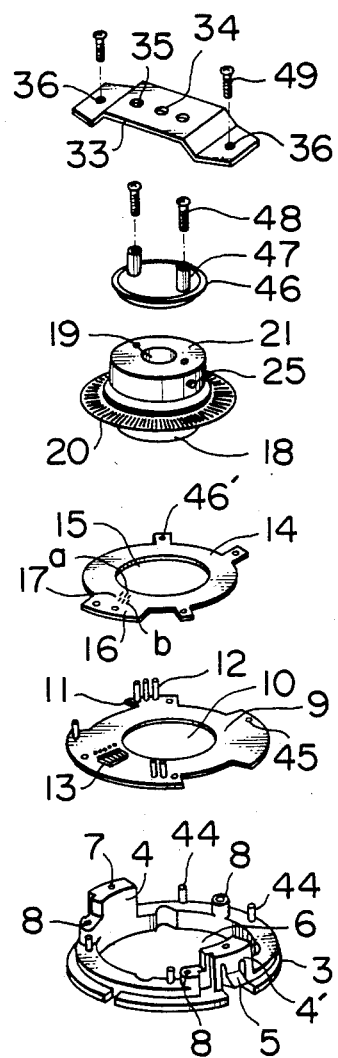

ROTARY ENCODER ASSEMBLY AND INSTALLATION FIXTURE

BACKGROUND OF THE INVENTION

1. Field of the Invention

This invention relates to a rotary encoder mounted on a shaft of a rotary body to precisely measure the number of revolutions per minute or to measure the angular phase thereof.

2. Description of the Prior Art

A rotary encoder has been generally used as a means for detecting the number of revolutions per minute of a rotary body or to measure the angular phase, such as a motor.

A rotary encoder of this kind is provided as generally known with a rotary slit disc connected to a rotary shaft of a rotary body via a connecting means, such as a boss to be rotationally moved and having slits therein, and a fixed slit disc disposed in opposition to the rotary slit disc, fastened to a mounting member of the rotary body and having slits therein. In order to detect an accurate number of revolutions per minute of a rotary body by such a rotary encoder, it is necessary that the rotary encoder be assembled as the rotary slit disc and fixed slit disc are opposed to each other via a very narrow gap of, for example, 0.5 mm with the rotary slit disc and fixed slit disc mounted on the rotary shaft at an accurate concentricity.

A conventional built-in type rotary encoder consists mainly of a first unit provided with such fixed slit disc and rotary slit disc as mentioned above, and a second unit composed of parts of an electronic circuit, such as an IC mounted on a printed board. The rotary encoder is so formed that it can be assembled usually on the part of a user by mounting the first unit on a rotary shaft of a rotary body, and thereafter mounting the second unit thereon, to carry out a desired operation for detecting the number of revolutions per minute of the rotary body.

Thus, a first unit in a built-in type rotary encoder does not have a rotary body, such as a motor initially, i.e. during the manufacture thereof; a first unit is adapted to be combined with a rotary body unitarily on the part of a user. However, when such a conventional rotary encoder is combined with a rotary body on the part of a user, special tools and jigs are required for regulating (a) the concentricity of a rotary shaft of the rotary body and a fixed slit disc, (b) the concentricity of the rotary shaft and a rotary slit disc, and (c) a gap between the fixed slit disc and rotary slit disc. Therefore, it is troublesome to assemble the rotary encoder and difficult to regulate the positional relation between the parts thereof. Namely, it is difficult to assemble the rotary encoder excellently unless the encoder manufacturer has a special knowhow for the matter.

SUMMARY OF THE INVENTION

The present invention has been developed in view of the above-mentioned drawbacks encountered in a conventional rotary encoder of this kind, and characterized in that a distance plate (connecting plate) is provided on a first unit, the positional relation between a fixed slit disc and a rotary slit disc being regulated in advance on the part of the manufacturer to ship the rotary encoder to a user with the above regulated positional condition retained by the distant plate, the rotary encoder being then combined with a rotary body on the part of the user, the distance plate being removed finally, whereby a rotary encoder having desired detecting functions and capable of maintaining a gap between the fixed slit disc and rotary slit disc at a predetermined level without carrying out any special regulating operations can be completed easily.

A first object of the present invention is to provide a rotary encoder, which permits a user to combine the same with a rotary body easily.

Another object of the present invention is to provide a rotary encoder, which permits a user to omit operations for regulating the positional relation between a fixed slit disc and a rotary slit disc with respect to the points (a), (b), (c) referred to previously.

Still another object of the present invention is to provide a rotary encoder having a comparatively simple construction and capable of being manufactured easily.

The above and other objects as well as advantageous features of the invention will become apparent from the following description of the preferred embodiment taken in conjunction with the accompanying drawings.

BRIEF DESCRIPTION OF THE DRAWINGS

FIG. 1 is a perspective view of an encoder according to the present invention;

FIG. 2 is an exploded view in prespective of an inner portion of the encoder according to the present invention;

FIG. 6 illustrates a case, wherein :

DESCRIPTION OF THE PREFERRED EMBODIMENT

Figure 3:
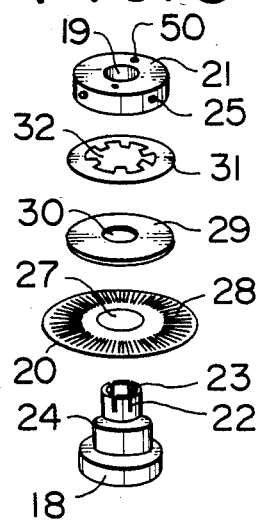
FIG. 3 is an exploded view in perspective of a rotary slit disc.

Referring to FIG. 1, reference numeral 1 denotes a case having a cylindrical form with a cord 2 shown at an upper portion thereof, which cord 2 is used to extract pulses outputted from the encoder and supply electric power to a light-emitting element, and 3 a bottom portion of a first unit.

FIG. 2 is an exploded view in perspective of a first unit. Referring to the drawing, reference numeral 3 denotes a bottom portion of the first unit, which bottom portion 3 comprises a ring type fixing body composed of a plastic material. The fixing body has a pair of upwardly projecting arms 4, 4' on an upper surface thereof, and locking claws 5 adapted to be engaged with an inner surface of the case 1 are provided on the outer side of the arms 4, 4'. The arms 4, 4' are provided in their respective upper surfaces with bores 7 for use in setting a connecting plate, which will be described later, on the fixing body 3. The fixing body 3 has a bore 6 in the central portion thereof, and also bores 8 for use in fastening the encoder according to the present invention to a body of a machine to be measured. The bottom portion 3 is further provided on its upper surface with projections 44 for use in setting thereon a printed plate 9 and a fixed slit disc 14, which will be described later.

Reference numeral 9 denotes a printed plate having a substantially annular body with a bore 10 formed in the central portion thereof. The printed plate 9 is further provided with an arcuate projection 11 at an outer circumferential portion thereof. Sockets 12 adapted to be engaged with connector pins, which are provided in an inner portion of the case 1, are provided on the arcuate projection 11 so as to extend in the upward direction. Reference numeral 13 denotes a photodetector connected to the sockets 12 with electric wires (not shown) in such a manner that an output from the photodetector 13 can be applied to a part of the sockets 12, and 45 bores, into which the projections 44 provided on the bottom portion 3 are inserted to join the printed plate 9 and bottom portion 3 together.

Reference numeral 14 denotes a fixed slit disc, which is substantially in the shape of a ring, and which provided with a bore 15 in the central portion thereof and a projection 16 at an outer circumferential portion thereof, 46' bores, into which the projections 44 provided on an upper surface of the bottom portion 3 are inserted, and 17 a plurality of slits provided in the fixed slit disc 14 so as to extend radially and be spaced from one another at regular intervals. The slits 17 in the embodiment shown in the drawings consist of an inner group a (closer to the center of the fixed slit disc), and an outer group b. The inner and outer groups a, b are staggered slightly from each other in such a manner that none of the slits in the groups a, b are on the same radius.

Reference numeral 18 denotes a fixed boss constituting a body of a rotary slit disc, 20 a rotary slit disc member, 21 a collar, and 19 a bore provided in the collar 21. An exploded view in perspective of the rotary slit disc is shown in FIG. 3.

Reference numeral 46 denotes a disc type plate support provided with a pair of posts 47 on an upper surface thereof, and 48 set screws for use in unitarily combining the plate support with a connecting plate 33, which will be described later.

Reference numeral 33 denotes a sectionally trapezoidal connecting plate provided in both end portions thereof with bores 36 for use in fixing the screws the connecting plate to the arms 4, 4' provided on the fixing body 3, 49 set screws, 35 bores, through which the posts on the plate support 46 are inserted, 34 a bore, into which a bonding agent is poured as will be described later.

The rotary slit disc will now be described with reference to FIG. 3, which is an exploded view in perspective thereof.

Referring to the drawing, reference numeral 21 denotes a collar having a substantially cylindrical shape and provided in its central portion with a bore 19, into which a rotary shaft of a rotary body to be inspected is inserted. A plurality of screws 25 are driven into the collar 21 from its side surface toward the center thereof. Reference numeral 50 denotes bores, into which screws are inserted.

Reference numeral 18 denotes a fixing boss having an upwardly extending shaft 24 in the central portion thereof, and a plurality of slits 22 in an upper portion thereof so as to extend in the axial direction thereof. The fixing boss has a so-called collet hub type construction. The shaft 24 is provided with an axially extending bore 23.

Reference numeral 20 denotes a disc type slitted plate provided with a bore 27 in the central portion thereof, and a plurality of slits 28 between the central bore 27 and an outer cercumference of the rotary slit disc member, these slits 28 are around radially at regular angular intervals.

Reference numeral 29 denotes a ring type holding plate, 30 a bore provided in the central portion thereof, and 31 a holding member having a bore 32 in the central portion thereof, the bore 32 having projections extending toward the center thereof.

In order to form a rotary slit disc, the rotary slit disc member 20 is placed on a larger diameter portion of the fixing boss 18, which constitutes a body of the rotary slit disc, and the holding plate 29 and holding member 31 are then placed on the rotary slit disc member 20. All of these parts are joined together unitarily with a bonding agent. The collar 21 is then brought into engagement with the shaft 24 to fix the collar 21 to an upper portion of the shaft 24 by caulking an upper end portion of the same shaft.

In order to assemble a first unit, the projections 44 provided on the upper surface of the fixing body 3 are inserted into the bores 45 in the printed plate 9 to superpose the printed plate 9 on the fixing body 3. The projections 44 are then inserted into the bores 46' in the fixed slit disc 14 to superpose the fixed slit disc 14 on the printed plate 9. The head portions of the projections 44 are then crushed to join the fixing body 3, printed plate 9 and fixed slit disc 14 together unitarily and thereby form a first unit. In the first unit thus constructed, the photodetector 13 on the printed plate 9 is positioned under the slits 17 in the fixed slit disc 14.

Figure 4:
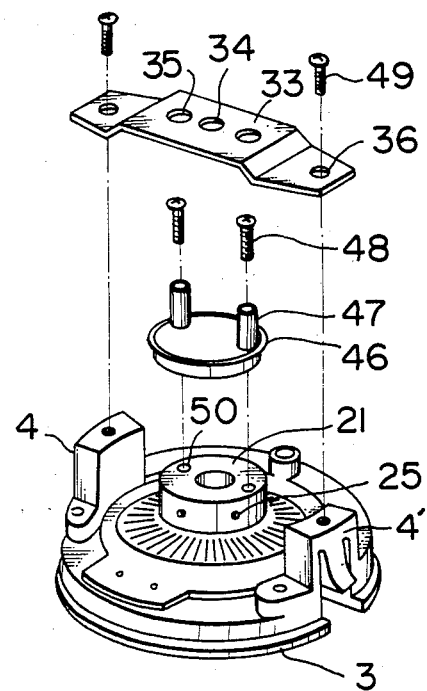
FIG. 4 illustrates how to assemble a first unit in the encoder according to the present invention.
Figure 5:
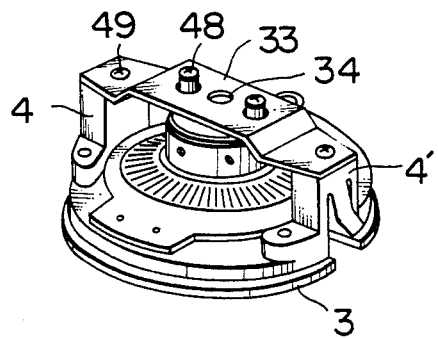
FIG. 5 illustrates the first unit in an assembled state.

In order to combine the first unit with the rotary slit disc, a bottom surface of the fixing body 3 is brought into contact with a front surface of a regulator jig (not shown) to be fixed thereto, so that the fixed slit disc 14 can be set firmly. A shaft projecting from the regulator jig is then inserted into the bore 19 provided in the central portion of the collar 21 until the fixed slit disc 14 and rotary slit disc member 20 have faced each other. The screws 25 inserted in the side surface of the collar 21 are tightened to fix the collar to the shaft of the jig. The shaft is then moved slightly in the axial direction to regulate a gap between the rotary slit disc member 2 and the fixed slit disc 14 to a predetermined distance. The plate support 46 is then placed on an upper surface of the collar 21 as shown in FIG. 4, and the screws 48 are driven into the bores 50 in the collar 21 through the bores in the posts 47 provided on the the plate support 46, to join the collar 21 and plate support 46 to each other unitarily. The connecting plate 33 is then placed on upper portions of the arms 4, 4' provided on the fixing body 3, and the screws 49 are driven into the bores in the arms 4, 4' through the bores 36 in the fixing plate 33 to fix the connecting plate 33 to the upper surfaces of the arms 4, 4'. The results of the above operations are shown in FIG. 5. A bonding agent consisting of a synthetic resing is then injected into the bore 34 provided in the central portion of the connecting plate 33 from the side portions of the connecting plate 33, and the synthetic resin is hardened to fix the plate support 46 and connecting plate 33 to each other. As a result, a gap between the rotary slit disc member 20 and the fixed slit disc 14 (refer to FIG. 2) can be maintained at a predetermined distance. The screws 25 in the collar 21 are then loosened to disconnect the collar 21 from the jig, and the fixing body 3 is removed from the front surface of the jig to thereby complete the first unit.

Figure 6A:
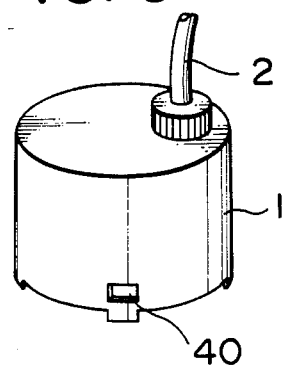
FIG. 6A is a prespective view.
Figure 6B:
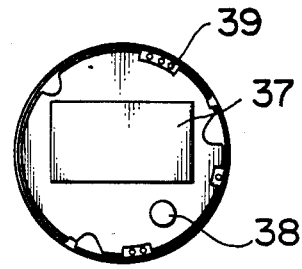
FIG. 6B is a plan view showing an inner portion.
Figure 7:
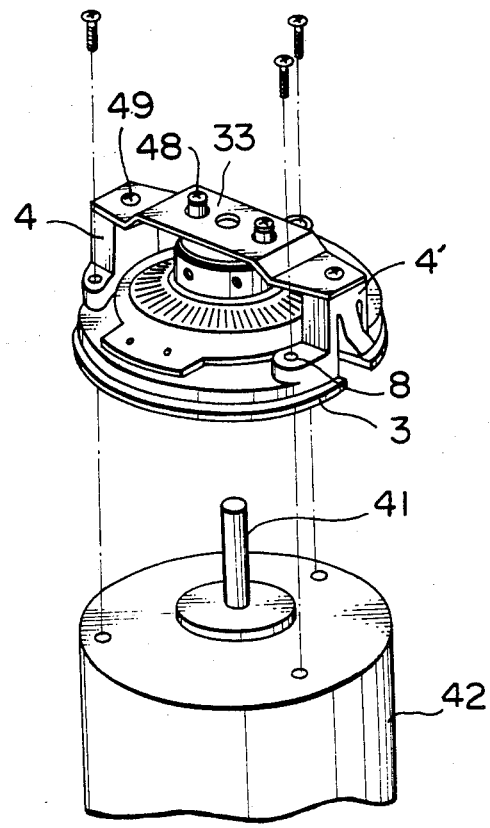
FIG. 7 illustrates how to mount the encoder on a rotary shaft of a rotary body.

FIGS. 6A and 6B illustrate a case 1 for the rotary encoder according to the present invention. Reference numeral 40 denotes one of windows used to engage the case 1 with the locking claws 5 provided on the outer side surfaces of arms 4, 4' on the fixing body 3.

FIG. 6B is a plan view illustrating an inner surface of the case 1. Reference numeral 37 denotes a printed board provided in the case 1, 38 a light-emitting diode, and 39 connector pins.

The encoder is shipped to a user as it is separated into the first and second units (the latter comprising the case 1, containing the printed board 37, the light-emitting diode 38, and the connector pins 39) mentioned above. In order to use this encoder on the part of a user, after taking out the second unit from the first unit, a rotary shaft 41 of a rotary machine is inserted into the bore 23 in the shaft 24 of the boss 18 in the first unit, and the two screws 25 are then tightened to fix the first unit to the rotary shaft. Screws are then inserted into the bores 8, which are used to set the fixing body 3 in the first unit, and thereafter into bores in a case 42 of the rotary machine to mount the first unit on the rotary machine. The screws 48, 49 shown in FIG. 5 are then loosened to be removed. When the connecting plate 33 is removed from the arms 4, 4', the plate support 46 is ready to be detached from the first unit. After the plate support 46 has been removed from the first unit, the second unit is set thereon to complete a rotary encoder mounting operation.

According to the present invention described above, the first and second units can be mounted on a rotary shaft easily and speedily even when a user has no special technical encoder-assembling knowledge.

How to use the rotary encoder according to the present invention will now be described. When a desired value of an electric current is supplied through the lead wire 2 after the encoder according to the present invention has been mounted on a rotary machine as mentioned above, the light-emitting diode is lit. When the rotary machine is then rotated, the rotary slit disc is rotated accordingly, and the light from the light-emitting diode reaches the photodetector through the slits provided in the rotary slit disc member and fixed slit disc, so that pulses of a predetermined voltage can be obtained from the photodetector. Since the number of pulses of this voltage is proportional to a speed of the rotary machine, the number of revolutions per minute of the rotary machine can be determined on the basis of an actual number of pulses per unit time. According to the present invention, the slits in the fixed slit disc consist of the groups a, b, which are staggered from each other. Therefore, the rotational direction of the rotary machine can also be detected with reference to a voltage of pulses received by the photodetector opposed to the slits.

The present invention is not, of course, limited to the above embodiment; it may be modified in various ways within the scope of the appended claims.

What is claimed is:

1. An optical rotary encoder assembly and installation fixture to be installed on a rotatable shaft, said assembly and installation fixture comprising a casing having a light-emitting element therein and a first unit combined with said casing, said first unit comprising:
   (a) a rotary member which, during use of the encoder, is rotated about a central axis, said rotary member comprising:
      (i) a boss having a central bore which extends therethrough and which is concentric with said central axis, said central bore being adapted to be mounted on rotary shaft the rotary speed of which is to be measured by the rotary encoder, and
      (ii) a rotary slit disc mounted on said boss perpendicularly to said central axis, said rotary slit disc having a plurality of slits extending therethrough in parallel to said central axis, said plurality of slits being radial to said central axis and being arranged around said central axis at regular angular intervals;
   (b) a stationary member which, during use of the encoder, is stationary relative to said rotary member, said stationary member comprising:
      (i) a fixing body having a central bore which extends therethrough concentrically with said central axis, said central bore being sized and shaped to journal said boss;
      (ii) at least two arms which extend from said fixing body in a first direction parallel to said central axis;
      (iii) a printed plate mounted on said fixing body adjacent to said rotary slit disc, said printed plate having a photo-detector mounted on the surface of said printed plate adjacent to said rotary slit disc in position to detect light shown through said plurality of slits during use of the encoder; and
   (c) an installation fixture which, during transport of the encoder, is rigidly fixed to said stationary member, said installation fixture comprising:
      (i) a connecting plate which is attached to said at least two arms and
      (ii) a plate support which is mounted on said connecting plate, said plate support bearing against said rotary member and preventing axial motion thereof during transport of the encoder.

2. An encoder as recited in claim 1 wherein the position of the interface between said connecting plate and said at least two arms determines the spacing between said rotary slit disc and said printed plate.

3. An encoder as recited in claim 1 wherein:
   (a) said plurality of slits in said rotary slit disc are divided into a first group each of which begins and ends at first and second radial distances from said central axis, respectively, and a second group each of which begins and ends at third and fourth radial distances from said central axis, respectively;
   (b) said third and fourth radial distances are greater than first and second radial distances; and
   (c) none of the slits in said first group is on the same radial line as any slit in said second group.

4. An encoder as recited in claim 1 wherein:
   (a) said rotary member further comprises a collar mounted on said boss perpendicularly to said central axis, said collar having a central bore which extends therethrough and which is concentric with said central axis, said central bore being sized, shaped, and positioned to receive said boss and said collar and said boss being sized, shaped, and positioned to hold said rotary slit disc therebetween, and
   (b) said stationary member further comprises a fixed slit disc mounted on said fixing body so as to overlay said printed plate and so as to be adjacent to said rotary slit disc, said fixed slit disc having a plurality of slits therein sized, shaped, and positioned to transmit light to said photo-detector.

5. A method of manufacturing, shipping, and installing an optical rotary encoder which reduces the need for skilled labor and complicated apparatus during installation by the use of an installation fixture,
  (a) said optical rotary encoder comprising a casing containing a light-emitting element therein and a subassembly which, during installation, is attached to a rotary shaft the rotary speed of which is to be measured and which is enclosed in said casing during installation, said subassembly comprising:
    (i) a rotary member which, during use of the encoder, is rotated about a central axis, said rotary member comprising:
      (A) a boss having a central bore which extends therethrough and which is concentric with said central axis, said central bore being adapted to be mounted on a rotary shaft the rotary speed of which is to be measured by the rotary encoder;
      (B) a rotary slit disc mounted on said boss perpendicularly to said central axis, said rotary slit disc having a plurality of slits extending therethrough in parallel to said central axis, said plurality of slits being radial to said central axis and being arranged around said central axis at regular intervals; and
      (C) a collar mounted on said boss perpendicularly to said central axis, said collar having a central bore which extends therethrough and which is concentric with said central axis, said central bore being sized, shaped, and positioned to receive said boss and said collar and said boss being sized, shaped, and positioned to hold said rotary slit disc therebetween, and
    (ii) a stationary member which, during use of the encoder, is stationary relative to said rotary member, said stationary member comprising:
      (A) a fixing body having a central bore which extends therethrough concentrically with said central axis, said central bore being sized and shaped to journal said boss;
      (B) at least two arms which extend from said fixing body in a direction parallel to said central axis;
      (C) a printed plate mounted on said fixing body adjacent thereto, said printed plate having a photo-detector mounted on the surface of said printed plate adjacent to said rotary slit disc in position to detect light shown through said plurality of slits in said rotary slit disc during use of the encoder; and
      (D) a fixed slit disc mounted on said fixing body so as to overlay said printed plate and so as to be adjacent to said rotary slit disc, said fixed slit disc having a plurality of slits therein sized, shaped, and positioned to transmit light to said photo-detector; and
  (b) said installation fixture comprising:
    (i) a connecting plate which, during transport of the encoder, is attached to said at least two arms and
    (ii) a plate support which, during transport of the encoder, is mounted on said connecting plate, said plate support bearing against said collar and preventing axial motion thereof during transport of the encoder,
  said method comprising the steps of:
  (c) placing said rotary slit disc on said boss;
  (d) joining said boss and said rotary slit disc together unitarily with a bonding agent;
  (e) placing said collar over said boss and on said rotary slit disc;
  (f) releasably joining said collar to said boss;
  (g) joining said printed plate, said fixed slit disc, and said fixing body together unitarily;
  (h) mounting a first unit comprising said printed plate, said fixed slit disc, and said fixing body on a regulator jig such that a shaft which projects from the regulator jig extends through said central bore in said fixing body;
  (i) sliding a second unit comprising said boss, said rotary slit disc, and said collar onto the shaft of the regulator jig until said fixed slit disc and said rotary slit disc face each other;
  (j) releasably fixing said collar to the shaft of the regulator jig;
  (k) moving the shaft of the regulator jig in the axial direction so as to regulate the gap between said rotary slit disc and said fixed slit disc to a predetermined width;
  (l) placing said plate support on the axial surface of said collar which is remote from said fixing body;
  (m) joining said collar and said plate support together unitarily;
  (n) placing said connecting plate over said plate support;
  (o) releasably fixing said plate and said connecting plate together unitarily;
  (p) releasably fixing said connecting plate to said at least two arms;
  (q) joining said connecting plate and said plate support together unitarily with a bonding agent, whereby the gap between said rotary slit disc and said fixed slit disc can be maintained at a predetermined width during shipping and installation;
  (r) releasing said collar and said first unit from the regulator jig;
  (s) shipping said casing and said subassembly;
  (t) inserting a rotary shaft the rotary speed of which is to be measured into said central bore in said boss;
  (u) fixing said collar to the rotary shaft;
  (v) fixing said fixing body against rotary motion;
  (w) releasing the releasable connection between said connecting plate and said plate support;
  (x) releasing the releasable connection between said connecting plate and said at least two arms;
  (y) removing said connecting plate and said plate support; and
  (z) mounting said casing over said first and second units,

* * * * *